United States Patent [19]

Smith et al.

[11] Patent Number: 5,373,045
[45] Date of Patent: Dec. 13, 1994

[54] LATEX FOR HEAT-RESISTANT INKS

[75] Inventors: George A. Smith, Newtown; Steven P. Boucher, Hatfield; Reuben H. Grinstein, Blue Bell, all of Pa.

[73] Assignee: Henkel Corporation, Plymouth Meeting, Pa.

[21] Appl. No.: 181,637

[22] Filed: Jan. 13, 1994

Related U.S. Application Data

[63] Continuation-in-part of Ser. No. 52,026, Apr. 22, 1993, abandoned, which is a continuation-in-part of Ser. No. 971,376, Nov. 4, 1992, abandoned.

[51] Int. Cl.$^5$ .............................................. C08L 37/00
[52] U.S. Cl. .................. 524/385; 524/549; 524/504; 524/413
[58] Field of Search ................. 524/413, 385, 504, 549

[56] References Cited

U.S. PATENT DOCUMENTS

| | | | |
|---|---|---|---|
| 3,903,034 | 9/1975 | Zabiak et al. | 524/548 |
| 4,339,370 | 7/1982 | Parker | 524/424 |
| 4,623,692 | 11/1986 | Hansen | 524/529 |
| 4,730,019 | 3/1988 | Hansen | 524/549 |
| 4,820,773 | 4/1989 | Alexander et al. | 525/274 |

*Primary Examiner*—Joseph L. Schofer
*Assistant Examiner*—Jeffrey T. Smith
*Attorney, Agent, or Firm*—Ernest G. Szoke; Wayne C. Jaeschke; John Daniel Wood

[57] ABSTRACT

A latex which affords a film having superior heat resistance, gloss, and transparency is comprised of: (1) water; (2) a styrene-maleic anhydride copolymer solubilized by a solubilizing amount of ammonium hydroxide; (3) a graft copolymer which is comprised of a portion of the solubilized styrenemaleic anhydride copolymer onto which is grafted a polymer formed from the polymerization of one or more polymerizable ethylenically unsaturated monomers selected from the group consisting of an acrylate, a methacrylate, an aromatic alkenyl monomer, an aliphatic alkenyl monomer, and combinations thereof; (4) a polymer dispersed in the water which is comprised of one or more ethylenically unsaturated monomers selected from the group consisting of an acrylate, a methacrylate, an aromatic alkenyl monomer, an aliphatic alkenyl monomer, and combinations thereof dispersed in the water; (5) a nonionic or anionic surfactant, or a combination thereof; and, (6) optionally, zinc or zirconyl ammonium carbonate. The latex has pH in the range of from about 9.0 to about 11.0.

22 Claims, 2 Drawing Sheets

FIG. I

LATEX FOR HEAT-RESISTANT INKS

CROSS-REFERENCE TO RELATED APPLICATIONS

This application is a continuation-in-part of application Ser. No. 08/052,026, filed Apr. 22, 1993, which is a continuation-in-part of application Ser. No. 07/971,376, filed on Nov. 4, 1992 now abandoned.

BACKGROUND OF THE INVENTION

1. Field of the Invention

This invention relates to a latex composition which, after application to a surface and drying, forms a heat-resistant film. More specifically, this invention relates to a latex composition which, when formulated into an ink and applied to a surface and dried, the dried ink exhibits superior heatresistant characteristics.

2. Description of the Related Art

Paper products such as corrugated cardboard frequently require printing for decorative and functional purposes. In some applications, the inks used in the printing operations must form a dried film which is resistant to heat so that subsequent operations such as heat sealing which require that the printed substrate pass through high temperature nips will not smear the ink. U.S.Pat. No. 4,730,019 teaches a coating composition having improved heat resistance, the coating composition comprising a ligand-free monomer maleic anhydride polymer that is able to be solubilized in an aqueous medium, and an effective amount of a metal ion-containing fugitive ligand complex to solubilize the polymer in the aqueous medium, said aqueous medium having a pH of from 7 to 9 wherein the ligand-free monomer is a polymerizable ethylenically unsaturated monomer selected from a group consisting of alpha-olefin, aromatic alkenyl monomer, acrylate monomer, methacrylate monomer and combinations thereof, wherein the metal ion of the metal ion-containing fugitive ligand complex is a zinc or zirconium ion, and wherein the fugitive ligand is ammonia. U.S. Pat. No. 4,730,019 teaches the use of an effective amount of zinc ammonium carbonate to form a solution. This polymer solution, unlike the composition according to the present invention which is a latex, is used in ink formulations for various printing applications. When the composition of U.S. Pat. No. 4,730,019 is used in an ink formulation for printing on paper surfaces such as corrugated cardboard, it does not exhibit the heat resistance necessary for subsequent fabrication operations such as heat sealing. No commercially available printing inks exhibit both acceptable optical properties of gloss and transparency and heat resistance. The latex composition according to the present invention yields a film which exhibits both good optical properties and heat resistance when subjected to elevated temperatures encountered in operations such as heat sealing.

SUMMARY OF THE INVENTION

It is an object of the invention to provide a latex which affords a film having superior heat resistance, gloss, and transparency. It is a further object of the invention to provide a latex for use in ink formulations wherein superior heat resistance is required. It has surprisingly been found that a latex composition which is comprised of: (1) water; (2) a styrene-maleic anhydride copolymer solubilized by a solubilizing amount of ammonium hydroxide; (3) a graft copolymer which is comprised of a portion of the solubilized styrene-maleic anhydride copolymer onto which is grafted a polymer formed from the polymerization of one or more polymerizable ethylenically unsaturated monomers selected from the group consisting of an acrylate, a methacrylate, an aromatic alkenyl monomer, an aliphatic alkenyl monomer, and combinations thereof; (4) a polymer dispersed in the water which is comprised of one or more ethylenically unsaturated monomers selected from the group consisting of an acrylate, a methacrylate, an aromatic alkenyl monomer, an aliphatic alkenyl monomer, and combinations thereof dispersed in the water; (5) a nonionic or anionic surfactant, or a combination thereof; and, (6) optionally, zinc or zirconyl ammonium carbonate. The latex has pH in the range of from about 9.0 to about 11.0 and produces a film having superior heat resistance. The latex can be used in printing ink formulations which require that the dry ink be thermally stable to operations such as heat sealing while retaining good optical properties such as gloss and transparency.

DESCRIPTION OF THE PREFERRED EMBODIMENTS

Figure 1:
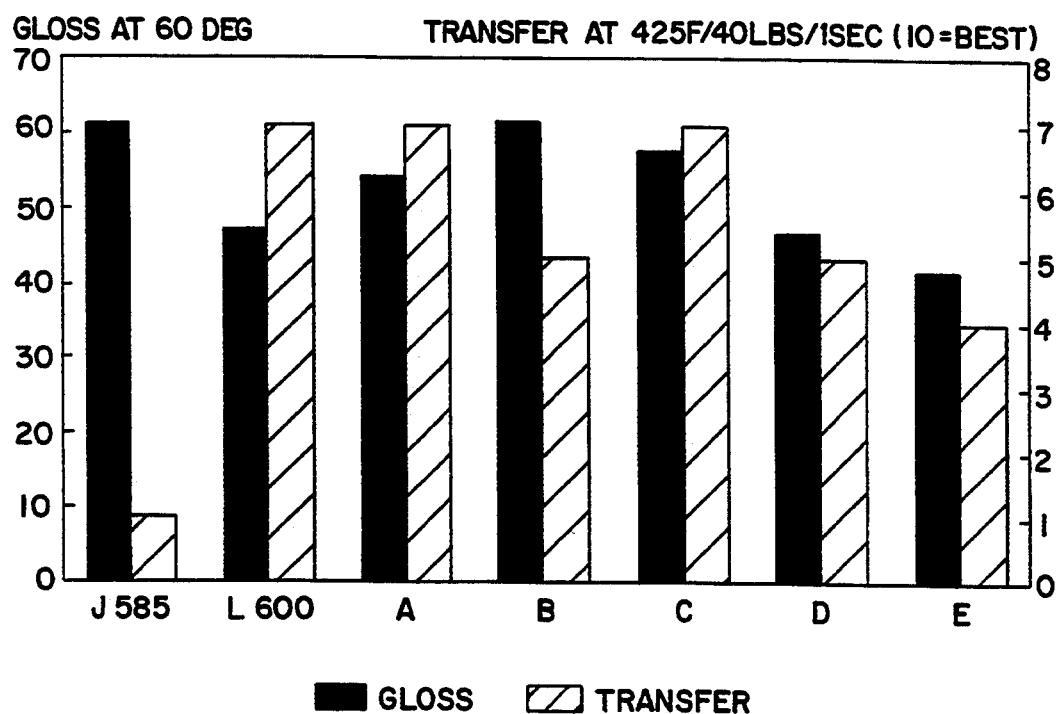
FIG. 1 is a bar graph which depicts the relative gloss and heat resistance performance of inks formulated with latexes according to the invention and two commercial products.

Other than in the operating examples, or where otherwise indicated, all numbers expressing quantities of ingredients or reaction conditions used herein are to be understood as modified in all instances by the term "about". The term copolymer as used herein means a polymer containing two or more distinct structural units. The term terpolymer as used herein means a copolymer which contains three distinct structural units.

The styrene-maleic anhydride copolymer according to the invention can be a styrene-maleic anhydride copolymer or a styrene-maleic anhydride terpolymer wherein the third unit can be the residue of any ethylenically unsaturated monomer (preferably monoethylenically unsaturated) which will copolymerize with styrene and maleic anhydride such as α-methylstyrene, alkyl half-esters of maleic acid such monomethyl maleate, monobutyl maleate, and the like, and acrylic or methacrylic acid. The latex composition according to the invention can contain, in addition to the styrene-maleic anhydride copolymer, an acid-containing polymer such as a mixture of a styrene/maleic anhydride copolymer and a styrene/α-methyl styrene/acrylic acid terpolymer. The nonionic surfactant which can used in the composition according to the invention is any nonionic which will assist in rendering the latex stable when the zinc or zirconyl ammonium carbonate is added. Suitable nonionic surfactants include but are not limited to ethoxylated nonyl phenols, ethoxylated octyl phenols, ethoxylated fatty alcohols, EO-PO block copolymers, and alkyl polyglucosides such as APG ® surfactants, trademark products of Henkel Corporation. The anionic surfactants which can be used in the composition according to the invention include but are not limited to such anionic surfactants as carboxylates, sulfonates, sulfates, phosphates, and alkyl benzene sulfonates. The preferred nonionic surfactants are ethoxylated octyl phenols. The preferred anionic surfactants are alkyl benzene sulfonates. A mixture of nonionic and anionic surfactants can also be used. The ethylenically unsaturated monomers, which are grafted onto the solubilized styrene-maleic anhydride copolymer or a mixture of a styrene-maleic anhydride copolymer and an acid-containing polymer as set forth above, are selected from the group consisting of an acrylate, a methacrylate, an aromatic alkenyl monomer, an aliphatic alkenyl monomer, and combinations thereof. Typically, the grafted portion of the copolymer will be copolymers of acrylic esters and methacrylic esters, terpolymers of acrylic esters, methacrylic esters, and vinyl acetate, terpolymers of acrylic esters, methacrylic esters, and vinyl chloride. The nature of the polymer dispersed in the water will depend upon the grafted portion of the graft styrene-maleic anhydride copolymer. This relationship arises from the process for making the latex composition according to the invention which comprises first completely dissolving a styrene-maleic anhydride copolymer or a combination of a styrene-maleic anhydride copolymer and a terpolymer such as a styrene/α-methyl styrene/acrylic acid terpolymer in an effective amount of ammonium hydroxide to form a dissolved polymer. An effective amount of ammonium hydroxide is an amount necessary to completely dissolve a styrene-maleic anhydride copolymer or a combination of a styrene-maleic anhydride copolymer and a terpolymer such as a styrene/α-methyl styrene/acrylic acid terpolymer. After the dissolution of the polymer or polymers is complete, one or more monomers selected from the group consisting of an acrylate, a methacrylate, an aromatic alkenyl monomer, an aliphatic alkenyl monomer, and combinations thereof are added to the aqueous ammoniacal solution containing the dissolved polymer. A nonionic or anionic surfactant or a combination of nonionic and anionic surfactants are added, thereby forming an emulsion of the added monomers, along with an amount of an initiator necessary to initiate the polymerization of the added monomers, e.g. 0.1% to 5% by weight of the latex composition. The initiator can be a free radical type such as a persulfate salt such as ammonium, sodium, or potassium persulfate; peroxides such hydrogen peroxide, t-butyl hydroperoxide, methyl ethyl ketone hydroperoxide, and the like. The initiator can also be a redox type initiator such as peroxy compounds with sodium bisulfite, sodium formaldehyde sulfoxylate, ascorbic acid and $Fe^{+2}$ salts. The preferred initiator is ammonium persulfate. A latex is then formed by heating the emulsion for a time sufficient to polymerize the added monomers. The added monomers can polymerize in the following ways: (a) by grafting onto the backbone of the dissolved polymer, (b) by a classical emulsion polymerization process wherein the monomers are dispersed in the water phase with the aid of the added anionic and/or nonionic surfactants and polymerized to form a colloidal dispersion of the polymer in the water. Since a first portion of the added monomers polymerizes by grafting onto the dissolved polymer backbone according to method (a) while a second portion polymerizes in the water phase according to method (b), the same monomers (i.e. monomers having the same chemical identity) make up the graft copolymer and the dispersed polymer. The final latex composition will then be composed of ungrafted styrene-maleic anhydride copolymer as component (2), a graft copolymer which is comprised of styrene-maleic anhydride copolymer onto which is grafted a polymer formed from the polymerization of one or more polymerizable ethylenically unsaturated monomers selected from the group consisting of an acrylate, a methacrylate, an aromatic alkenyl monomer, an aliphatic alkenyl monomer, and combinations thereof as component (3); and an ungrafted polymer dispersed in the water which is comprised of one or more ethylenically unsaturated monomers selected from the group consisting of an acrylate, a methacrylate, an aromatic alkenyl monomer, an aliphatic alkenyl monomer, and combinations thereof dispersed in the water as component (4), the monomers which make up the graft portion of the graft copolymer of component (3) having the same chemical identity as the monomers which make up the ungrafted polymer of ethylenically unsaturated monomers of component (4). The ethylenically unsaturated monomers are typically mono-ethylenically unsaturated, thus, the polymer of component (4) is typically linear. The ungrafted styrene-maleic anhydride copolymer of component (2) is typically also linear. The graft copolymer of component (3) is non-linear because it is branched at the graft sites of the graft copolymer.

After the added monomers are polymerized, the latex is cooled to room temperature and then the pH is adjusted to 9.0 with ammonium hydroxide. Optionally, zinc or zirconyl ammonium carbonate is then added to the latex and the pH of the resulting latex is between 9 and 11.

Either zinc ammonium carbonate or zirconium ammonium carbonate can be used according to the invention with zinc ammonium carbonate being the preferred compound. Either one or both of these carbonate salts are added to the emulsion to serve as a crosslinking agent after the water in the latex evaporates as it does when the latex is used as a component of a printing ink. The use of zinc ammonium carbonate to crosslink an emulsion polymer composition is taught in U.S. Pat. No. 4,339,370, the entire contents of which are incorporated herein by reference. The preferred amount of zinc ammonium carbonate or zirconium ammonium carbonate is an amount such that the molar ratio of Zn/acid groups in the latex is 0.50. A preferred latex is one which is comprised of water; a copolymer mixture of styrene-maleic anhydride and a styrene-α-methylstyrene-acrylic copolymer which is solubilized by an effective amount of ammonium hydroxide; (3) a graft copolymer, the grafted portion of which is comprised 2-ethylhexylacrylate and methyl methacrylate, and which is grafted onto a portion of the solubilized copolymer mixture; (4) a copolymer comprised of 2-ethylhexylacrylate and methyl methacrylate dispersed in the water; (5) Triton® X-305; (6) zinc ammonium carbonate. The latex has a pH of from about 9.0 to about 11.0.

Figure 2:
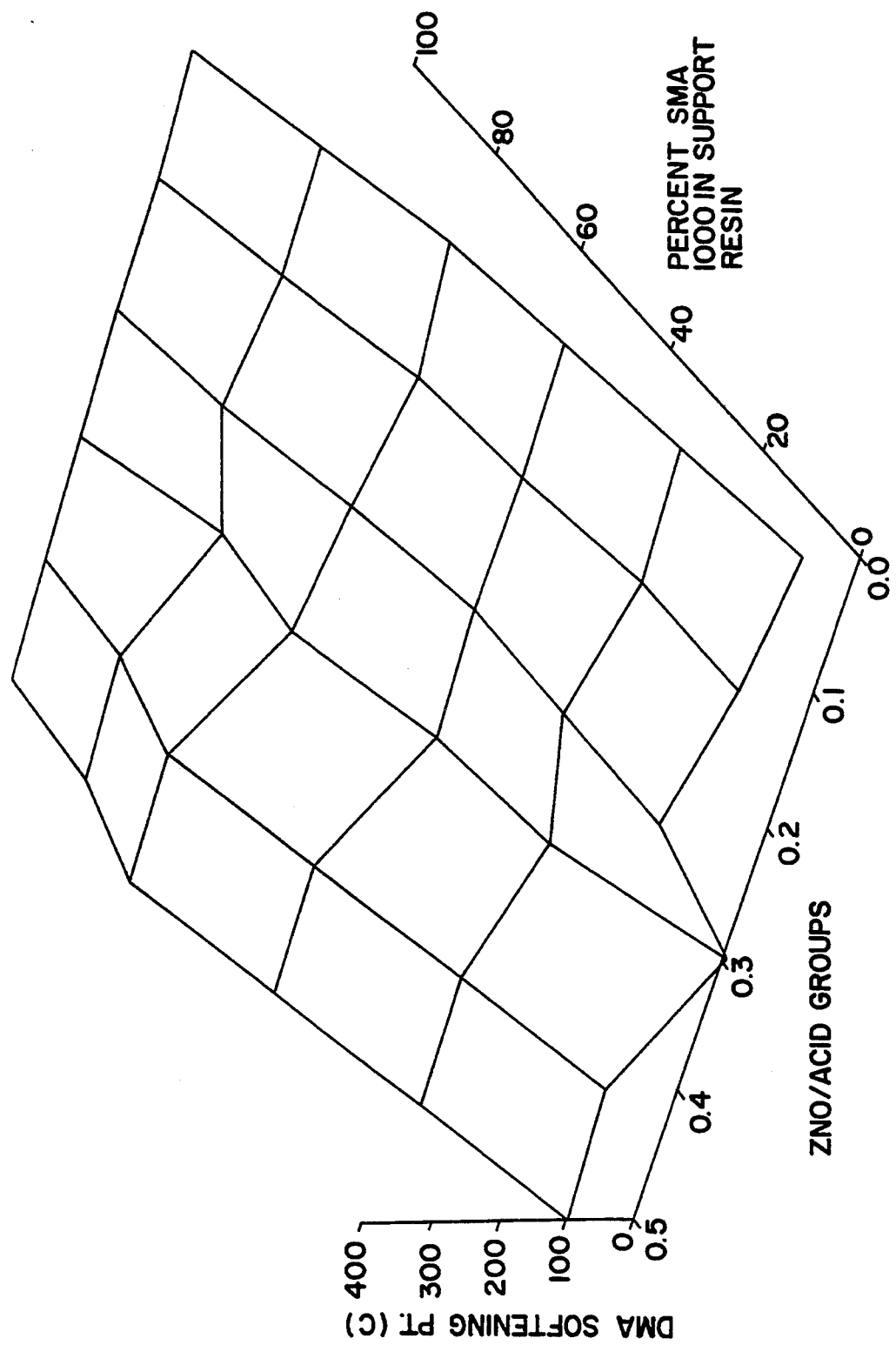
FIG. 2 is a graph which shows that some heat resistance is achieved in latexes according to the invention having no zinc.

It has also been found that a latex composition according to the invention containing no zinc exhibits some amount of heat resistance. The graph in FIG. 2 shows that even when the ZnO/acid ratio is zero, a latex film exhibits some heat resistance as evidenced by the fact that its Dynamic Mechanical Analysis softening point is greater that 0° C. and less than about 100° C. Latexes according to the invention having no zinc can be useful for certain types of applications such as, for example, in cases where the heat resistance requirement is not extreme, where there is a danger of zinc contamination in an aqueous effluent, or where the user may wish to add zinc as an additive.

The latex composition is preferably comprised of: (1) water in an amount of 30% to 70%, preferably 50% to 60%; (2) a styrene-maleic anhydride copolymer solubilized by a solubilizing amount of ammonium hydroxide in an amount of 0.1% to 20%, preferably 2% to 10%; (3) a graft copolymer which is comprised of a portion of the solubilized styrene-maleic anhydride copolymer onto which is grafted a polymer formed from the polymerization of one or more polymerizable ethylenically unsaturated monomers selected from the group consisting of an acrylate, a methacrylate, an aromatic alkenyl monomer, an aliphatic alkenyl monomer, and combinations thereof, in an amount of 0.1% to 30%, preferably 1% to 10%; (4) a polymer dispersed in the water which is comprised of one or more ethylenically unsaturated monomers selected from the group consisting of an acrylate, a methacrylate, an aromatic alkenyl monomer, an aliphatic alkenyl monomer, and combinations thereof dispersed in the water, in an amount of 10% to 50%, preferably 20% to 40%; (5) a nonionic or anionic surfactant, or a combination thereof, in an amount of 0.1 to 5%, preferably 0.5% to 1.5%; and, (6) optionally, zinc or zirconyl ammonium carbonate in an amount of 0.1% to 5%, preferably 1% to 4%, all percentages by weight based on the total weight of the latex composition.

The following examples are meant to illustrate but not limit the invention.

EXAMPLE 1

Preparation of Latexes According the Invention Containing Zinc

About 100 grams of G-CRYL®5000, a styrene-α-methylstyrene-acrylic copolymer which is a registered trademark product of Henkel Corporation, 212 grams of water and 21 grams of 28% aqueous ammonium hydroxide were mixed for 20 minutes at high speed in a blender. The resulting polymer solution was filtered to remove insoluble particulate matter and had a solids content of 31.6% by weight and a pH of 8.5. About 103 grams of the polymer solution was mixed with 66 grams of SMA®1000H, a 40% by weight aqueous ammoniacal solution of a styrene-maleic anhydride copolymer which is a trademark product of ELF Atochem, North America, Inc., 7.0 grams of Triton®X-305, which is octylphenoxy polyethoxy ethanol, a trademark product of Union Carbide Corporation, 80 grams of DI water, and 0.91 grams of a aqueous ammonium hydroxide to bring the pH to 8.6. To this solution was added 1.7 grams of ammonium persulfate in 5 grams of DI water. The reaction mixture was heated to 77° C. at which time 14 grams of a monomer mixture comprised of 121 grams of 2-ethylhexylacrylate (EHA) and 20 grams of methyl methacrylate (MMA) (86% EHA; 14% MMA). When the reaction temperature reached 80° C., the remaining monomer mixture was added slowly over a period of 80 minutes while maintaining the temperature at 80° C. After the monomer addition was complete, 1 gram of t-butylhydroperoxide and 3 grams of a 5.7% by weight aqueous sodium ascorbate solution were added followed by 6 grams of additional ascorbate solution in 3 gram slugs at 10 minute intervals. After a total of 9 grams of the ascorbate solution was added, the temperature was reduced to 40° C. and 91 grams of Chemcor ZAC, a zinc ammonium carbonate solution whose Zn content is expressed as 15% ZnO and which is a trademark product of Chemical Corp. of America, were added over 25 minutes while the temperature remained essentially constant.

EXAMPLE 2-5

The latexes of Examples 2-4 were prepared in exactly the same manner as in Example 1 except that the composition of the monomer mixture was changed as listed below.

Example 2 43% EHA; 43% STY(styrene); 14% MMA

Example 3 57% EHA; 43% MMA

Example 4 22% EHA; 64% STY; 14% MMA

Example 5 86% STY; 14% MMA

Inks formulated with the latexes from Examples 1-5 were tested for transfer at 425° F. which measures heat resistance and gloss at 75° F. against two commercially available products used in ink formulations. The relative performance of the samples is shown in FIG. 1. The latexes A-E correspond to Examples 1-5 respectively. The data clearly show that inks formulated with latexes A-E, all of which are latexes according to the invention, were superior inks formulated with to Joncryl® 585, a trademark product of S. C. Johnson & Sons, Racine, Wis., and that latexes A and C were superior to inks formulated with Lucidene®600, a trademark product of Morton International, Chicago, Ill. All inks listed in FIG. 1 were formulated with Flexiverse® Red (Barium Lithol) RFD-3217 as per Example 6.

EXAMPLE 6

Preparation of Ink Formulations

All inks were prepared using predispersed pigments. Three different pigment dispersions were used in the performance testing were Flexiverse® Red (Lithol Rubine) RFD 4247, Flexiverse® Red (Barium Lithol) RFD-3217, and Flexiverse® Blue (Phthalocyanine) BFD 1123, all trademark products of Sun Chemical Corp., Amelia, Ohio. A heat-resistant latex was blended with the pigment dispersion, so that the solids are comprised of 60% by weight latex and 40% by weight of pigment, and the viscosity adjusted to 20 seconds on a #2 Shell cup using DI water. The iso-viscous ink samples were drawn down on Leneta opacity cards using a #6 Meyer rod and dried using a forced air gun.

EXAMPLE 7

Comparative Example Relative Properties of Inks

Inks formulated with the latex of Example 1 and the resin cut from Example 1 of U.S. Pat. No. 4,623,692 were compared for the gloss, release, transfer, hot rub, and transparency of the films remaining after the inks dried under the conditions indicated. The release and transfer tests are performed to determine the behavior of the inks during simulated heat-sealing operations. The relative performance is given in Table 1.

TABLE 1

| Sample[1] | Gloss[2] | Release[3] | Transfer[4] | Hot Rub[5] | Trpncy[6] |
|---|---|---|---|---|---|
| A | 81 | Slt. Cling | 5 | 8 | 6 |

TABLE 1-continued

| | Performance of Inks | | | | |
|---|---|---|---|---|---|
| Sample[1] | Gloss[2] | Release[3] | Transfer[4] | Hot Rub[5] | Trpncy[6] |
| B | 74 | Slt. Block | 6 | 4 | 3 |

[1]A-ink formulated with latex of Example 1 as per Example 6. B-ink formulated with resin cut prepared according to Example 1 of U.S. Pat. No. 4,623,692.
[2]Reflectance determined on Technidyne Corp. Gloss Meter Model #T480A at 75°.
[3]Relative amount of force required to pull uncoated Leneta sheet adhered to film in a Sentinel Heat Sealer, Model 12-12AS (Packaging Industries, Hyannis, MA) at 425° F. for 1 second at 40 psi. Slight cling > slight block > block.
[4]Relative amount of ink transferred to uncoated Leneta sheet in Release Test. (10 = least amount transferred)
[5]Relative smearing of ink applied to Leneta card in Release Test after 25 double rubs with iron at 425° F. (10 = least amount smeared)
[6]Transparency determined on Technidyne Corp. Gloss Meter Model #T480A at 75°.

EXAMPLE 8

Preparation of Latexes According the Invention Containing No Zinc

About 100 grams of G-CRYL® 5000, a styrene-α-methylstyrene-acrylic copolymer which is a registered trademark product of Henkel Corporation, 212 grams of water and 21 grams of 28% aqueous ammonium hydroxide were mixed for 20 minutes at high speed in a blender. The resulting polymer solution was filtered to remove insoluble particulate matter and had a solids content of 31.6% by weight and a pH of 8.5. About 103 grams of the polymer solution was mixed with 66 grams of SMA® 1000H, a 40% by weight aqueous ammoniacal solution of a styrene-maleic anhydride; copolymer which is a trademark product of ELF Atochem, North America., Inc., 7.0 grams of Triton® X-305, 80 grams of DI water, and 0.91 grams of a aqueous ammonium hydroxide to bring the pH to 8.6. To this solution was added 1.7 grams of ammonium persulfate in 5 grams of DI water. The reaction mixture was heated to 77° C. at which time 14 grams of a monomer mixture comprised of 121 grams of 2-ethylhexylacrylate (EHA) and 20 grams of methyl methacrylate (MMA) (86% EHA; 14% MMA). When the reaction temperature reached 80° C., the remaining monomer mixture was added slowly over a period of 80 minutes while maintaining the temperature at 80° C. After the monomer addition was complete, 1 gram of t-butylhydroperoxide and 3 grams of a 5.7% by weight aqueous sodium ascorbate solution were added followed by 6 grams of additional ascorbate solution in 3 gram slugs at 10 minute intervals until a total of 9 grams of the ascorbate solution was added.

What is claimed is:

1. A latex composition which comprises: (1) water; (2) a styrene-maleic anhydride copolymer solubilized by an effective amount of ammonium hydroxide; (3) a graft copolymer comprised of one or more polymerizable ethylenically unsaturated monomers selected from the group consisting of an acrylate, a methacrylate, an aromatic alkenyl monomer, an aliphatic alkenyl monomer, and combinations thereof grafted onto a portion of said styrene-maleic anhydride copolymer; (4) a polymer of one or more ethylenically unsaturated monomers selected from the group consisting of an acrylate, a methacrylate, an aromatic alkenyl monomer, an aliphatic alkenyl monomer, and combinations thereof; (5) a nonionic surfactant, anionic surfactant, or a combination thereof; (6) zinc or zirconyl ammonium carbonate; and wherein said latex has a pH of from about 9.0 to about 11.0.

2. The latex composition of claim 1 wherein said styrene-maleic anhydride copolymer is a styrene-α-methylstyrene-acrylic copolymer.

3. The latex composition of claim 1 wherein said nonionic surfactant is octylphenoxy polyethoxy ethanol.

4. The latex composition of claim 1· wherein the molar ratio of zinc ammonium carbonate to acid groups in said latex is about 0.5.

5. A latex composition which comprises: (1) water; (2) a copolymer mixture comprised of styrene-maleic anhydride copolymer and a styrene-α-methylstyrene-acrylic copolymer wherein said mixture is solubilized by an effective amount of ammonium hydroxide; (3) a graft copolymer, the grafted portion of which is comprised of 86% by weight of 2-ethylhexylacrylate and 14% by weight of methyl methacrylate and grafted onto a portion of said copolymer mixture; (4) a copolymer comprised of 86% by weight of 2-ethylhexylacrylate and 14% by weight of methyl methacrylate; (5) a nonionic surfactant; (6) zinc ammonium carbonate; and wherein said latex has a pH of from about 9.0 to about 11.0.

6. A latex composition prepared by the process which comprises: (1) dissolving a styrene-maleic anhydride copolymer in an effective amount of ammonium hydroxide; (2) adding to the solution formed in step (1) one or more monomers selected from the group consisting of an acrylic monomer, methacrylic monomer, and combinations thereof; a nonionic or anionic surfactant, and an initiator; (3) forming a latex by heating the emulsion formed in step (2) for a time sufficient to polymerize said monomers; (4) cooling said latex to room temperature and then raising the pH of said latex to about 9.0 with ammonium hydroxide; and, (5) adding zinc or zirconyl ammonium carbonate such that the molar ratio of Zn/acid groups in said latex is 0.50.

7. The latex composition of claim 6 wherein said styrene-maleic anhydride copolymer is a styrene-α-methylstyrene-acrylic copolymer.

8. The latex composition of claim 6 wherein said nonionic surfactant is octylphenoxy polyethoxy ethanol.

9. The latex composition of claim 6 wherein the molar ratio of zinc ammonium carbonate to acid groups in said latex is about 0.5.

10. The latex composition of claim 6 wherein said initiator is ammonium persulfate.

11. An ink comprised of a pigment and a latex composition which comprises: (1) water; (2) a styrene-maleic anhydride copolymer solubilized by an effective amount of ammonium hydroxide; (3) a graft copolymer comprised of one or more polymerizable ethylenically unsaturated monomers selected from the group consisting of an acrylate, a methacrylate, an aromatic alkenyl monomer, an aliphatic alkenyl monomer, and combinations thereof grafted onto a portion of said styrene-maleic anhydride copolymer; (4) a polymer of one or more ethylenically unsaturated monomers selected from the group consisting of an acrylate, a methacrylate, an aromatic alkenyl monomer, an aliphatic alkenyl monomer, and combinations thereof; (5) a nonionic surfactant, anionic surfactant, or a combination thereof; t6) zinc or zirconyl ammonium carbonate; and wherein said latex has a pH of from about 9.0 to about 11.0.

12. The ink of claim 11 wherein said pigment is selected from The group consisting of Lithol Rubine, Barium Lithol and Phthalocyanine.

13. The ink of claim 12 wherein said ink is comprised of about 40% of said pigment and 60% of said latex based on the weight of total solids of said ink.

14. A latex composition which comprises: (1) water; (2) a styrene-maleic anhydride copolymer solubilized by an effective amount of ammonium hydroxide; (3) a graft copolymer comprised of one or more polymerizable ethylenically unsaturated monomers selected from the group consisting of an acrylate, a methacrylate, an aromatic alkenyl monomer, an aliphatic alkenyl monomer, and combinations thereof grafted onto a portion of said styrene-maleic anhydride copolymer; (4) a polymer of one or more ethylenically unsaturated monomers selected from the group consisting of an acrylate, a methacrylate, an aromatic alkenyl monomer, an aliphatic alkenyl monomer, and combinations thereof; (5) a nonionic surfactant, anionic surfactant, or a combination thereof; and wherein said latex has a pH of from about 9.0 to about 11.0.

15. The latex composition of claim 1 wherein said styrene-maleic anhydride copolymer is a styrene-α-methylstyrene-acrylic copolymer.

16. The latex composition of claim 14 wherein said nonionic surfactant is octylphenoxy polyethoxy ethanol.

17. A latex composition which comprises: (1) water; (2) a copolymer mixture comprised of styrene-maleic anhydride copolymer and a styrene-α-methylstyrene-acrylic copolymer wherein said mixture is solubilized by an effective amount of ammonium hydroxide; (3) a graft copolymer, the grafted portion of which is comprised of 86% by weight of 2-ethylhexylacrylate and 14% by weight of methyl methacrylate and grafted onto a portion of said copolymer mixture; (4) a copolymer comprised of 86% by weight of 2-ethylhexylacrylate and 14% by weight of methyl methacrylate; (5) a nonionic surfactant; and wherein said latex has a pH of from about 9.0 to about 11.0.

18. The latex composition of claim 17 wherein said styrene-maleic anhydride copolymer is a styrene-α-methylstyrene-acrylic copolymer.

19. The latex composition of claim 17 wherein said nonionic surfactant is octylphenoxy polyethoxy ethanol.

20. An ink comprised of a pigment and a latex composition which comprises: (1) water; (2) a copolymer mixture comprised of styrene-maleic anhydride copolymer and a styrene-α-methylstyrene-acrylic copolymer wherein said mixture is solubilized by an effective amount of ammonium hydroxide; (3) a graft copolymer, the grafted portion of which is comprised of 86% by weight of 2-ethylhexylacrylate and 14% by weight of methyl methacrylate and grafted onto a portion of said copolymer mixture; (4) a copolymer comprised of 86% by weight of 2-ethylhexylacrylate and 14% by weight of methyl methacrylate; (5) octylphenoxy polyethoxy ethanol; and wherein said latex has a pH of from about 9.0 to about 11.0.

21. The ink of claim 20 wherein said pigment is selected from The group consisting of Lithol Rubine, Barium Lithol and Phthalocyanine.

22. The ink of claim 20 wherein said ink is comprised of about 40% of said pigment and 60% of said latex based on the weight of total solids of said ink.

* * * * *